April 13, 1965

D. W. RUDD 3,178,112

APPARATUS FOR CONTINUOUSLY MEASURING THE
TEMPERATURE OF A MOVING SURFACE

Filed Dec. 14, 1960

INVENTOR
DAVID WILLIAM RUDD

BY *Harry E. Braddock*

ATTORNEY

United States Patent Office 3,178,112
Patented Apr. 13, 1965

3,178,112
APPARATUS FOR CONTINUOUSLY MEASURING THE TEMPERATURE OF A MOVING SURFACE
David William Rudd, Chesterfield County, Va., assignor to E. I. du Pont de Nemours and Company, Wilmington, Del., a corporation of Delaware
Filed Dec. 14, 1960, Ser. No. 75,731
1 Claim. (Cl. 236—1)

This invention relates to the measurement of the surface temperature of heated objects and more particularly to an improved temperature sensing device for use in continuously measuring the temperature of heated, rapidly moving surfaces.

In many operations it is desirable to measure continuously the temperature of moving surfaces as for instance in the use of heated rotating rollers which are widely employed. In applications such as in the drying of yarn by passing it over hot rollers or in the sintering of a cellulose matrix containing polytetrafluoroethylene by passing the yarn over heated rollers to burn off the cellulose and coalesce the polytetrafluoroethylene as described in U.S. Patent 2,772,444, it is particularly desirable that the surface temperature be accurately and continuously determined in order to adequately control the process since the temperature of the interior of the roller usually is much higher than that at the surface.

It is an object of this invention to provide an improved, reliable, and simple temperature sensing arrangement suitable for continuous and accurate measurement of the temperature of high speed moving surfaces.

Another object is to provide an improved, effective, quick response temperature sensing arrangement which is particularly suited to the measurement of the surface temperature of heated, rapidly rotating rollers.

It is another object of this invention to provide such an improved apparatus which has a long life of reliable operation at very high temperatures and which functions with roll elements having a precision chromium finish without marking, scratching, coating or otherwise damaging the finish.

Other objects will become apparent from the description and discussion to follow.

The above objects are accomplished by the provision of a novel temperature sensing apparatus comprising a means for slideably contacting a moving surface, said means having a low coefficient of friction at the point of contact, possessing a slow continuous even wear rate at high temperatures and relatively high thermal conductivity; means for holding said contacting means against the moving surface under a slight, constant pressure; a thermocouple capable of substantially instantaneous response to temperature changes imbedded within said surface contacting means and conductors for connecting said thermocouple to temperature-indicating and controlling means.

Other objects and advantages will appear from a consideration of the following specification, claim and drawings in which:

Figure 1:
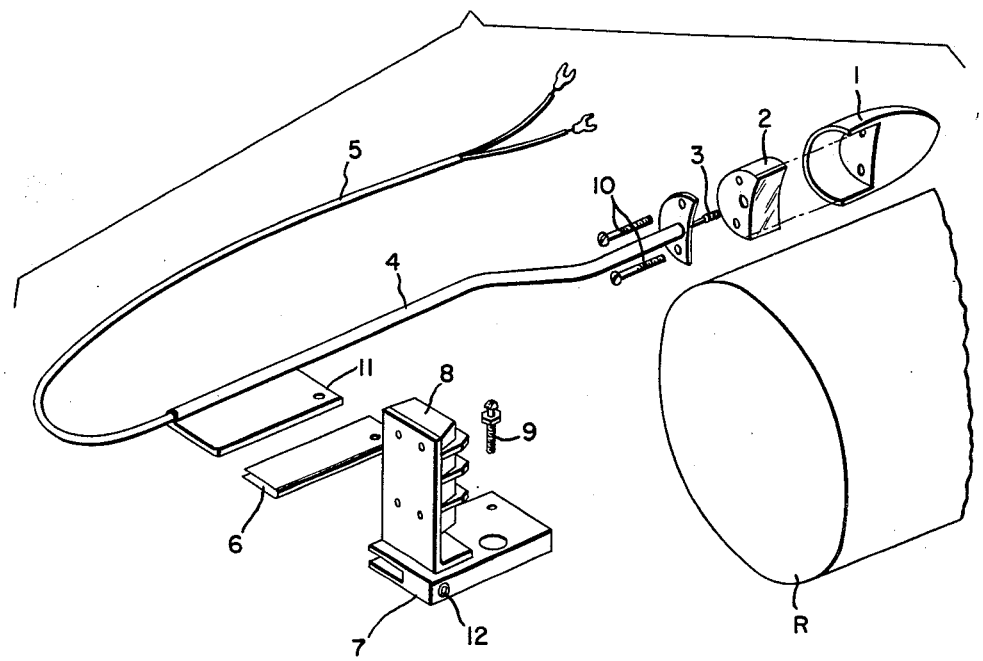
FIGURE 1 is a perspective exploded view of the temperature sensing apparatus embodying the present invention.

One preferred embodiment of the temperature sensing device of this invention is shown in the drawings. As shown in FIGURE 1 the thermocouple is imbedded in a brass screw 3 which is screwed into the surface contacting means 2. The surface contacting means, the cover 1 and the supporting arm 4 are then assembled and fastened together by means of screws 10. When assembled the temperature sensing means 2 protrudes slightly from the cover 1 in a radial direction so that contacting of the hot surface by the cover is prevented. In this embodiment the temperature contacting means is shaped to match the surface of a roller. The support arm 4 is held in bracket 7 as indicated. The combination is mounted for quick, easy removal for cleaning or clearing of jams. Fabric 6, which is preferably of TFE-fluorocarbon fiber, is placed around hinge-plate 11 to provide a low friction bearing surface. A small coil spring (not shown) in slotted bracket 7 provides the low, substantially constant pressure necessary for contacting the roller. The spring is held in place by set screw 12. Pivot pin 9, which passes thru the hole in hinge-plate 11, permits the support arm to move slightly against the pressure of the spring. The cover 1 is made of aluminum while the arm 4 and bracket 7 are made of stainless steel. For convenience a two-position terminal block 8 is attached to the bracket for connection of the thermocouple leads to temperature indicating or controlling means. In this embodiment the temperature sensing means is made of type AY electrographite. This grade of electrographite has a very low coefficient of friction and a sclerometer hardness of about 80.

The surface contacting unit 2 may be made of any suitable material which has a low coefficient of friction and good thermal conductivity. A metal such as molybdenum is suitable in many applications. The preferred material, however, is graphite of the type commonly referred to in the trade as electrographite. Suitable contacting blocks may be shaped from electrographite of the type used for brushes in electric motors and generators. This material wears slowly, conducts heat adequately and is particularly suitable for use with chrome plated rollers since it does not damage the surface of the rollers at high temperatures.

The thermocouple may be selected from the numerous types which are well-known in the art. Iron-constantan thermocouples are suitable for many applications. However, other thermocouples such as platinum-platinum, rhodium; Chromel-p-Alumel and copper-constantan may be used where they are suitable for the particular application.

The thermocouple may be imbedded directly in the surface contacting means, however, it is preferable that the thermocouple be imbedded in a metal holder such as a metal screw which may be threaded into the contacting means. This may be readily accomplished by boring a hole of suitable size in a brass screw and fixing the thermocouple in place by means of silver solder.

The thermocouple should be imbedded in the contacting means at a point relatively close to the contacting surface so that the temperature of the heated surface is readily transmitted to the thermocouple and only the minimum correction in the calibration of the thermocouple is required to compensate for the distance. Preferably the thermocouple is imbedded at a distance of $\frac{1}{4}$ to $\frac{1}{2}$ inch from the contacting surface. Since the wearing away of the contacting surface is quite slow, the distance between the heated surface and the thermocouple remains relatively constant. However, it may be necessary to occasionally make a slight correction for the change in distance. With electrographite contacting means this is not normally needed at intervals more often than about 30 days when the device is in continuous operation.

The voltage generated by the thermocouple, which is proportional to the temperature of the heated surface, may be used to indicate, record and control the temperature of the heated surface by the use of conventional electronic equipment which is well-known in the art. Calibration of the equipment is readily accomplished by means of portable thermocouple and indicating means of a conventional type. In this operation, the thermocouple is manually placed against the heated surface to determine the correction which must be applied to the temperature indicated by the device of this invention.

The surface contacting means may be held lightly in place against the heated surface by any suitable arrangement. The bracket and arm shown in the attached drawings provide a convenient means for accomplishing this. The bracket, arm and cover assembly may be made of any suitable material such as metal, plastic, reinforced resin, etc.

Figure 2:
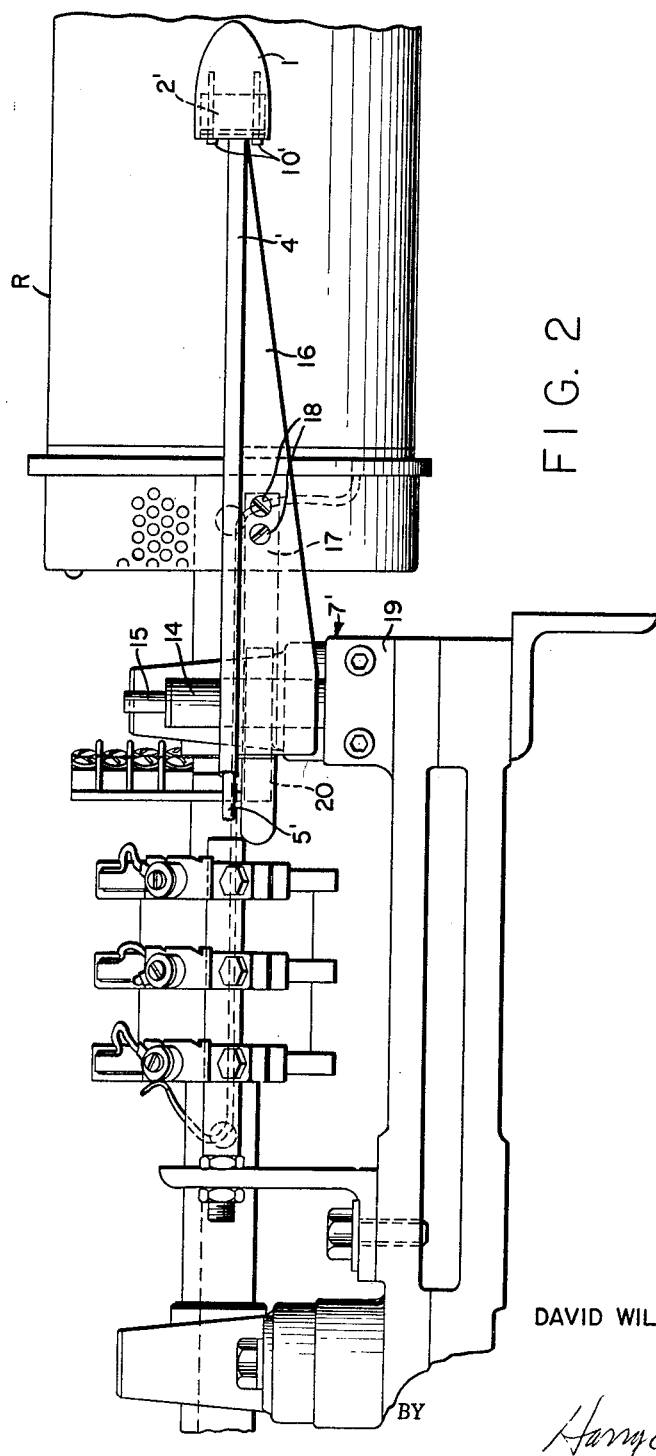
FIGURE 2 is a side elevational view of the apparatus of the present invention shown in cooperative association with the surface of a heated roll element.
Figure 3:
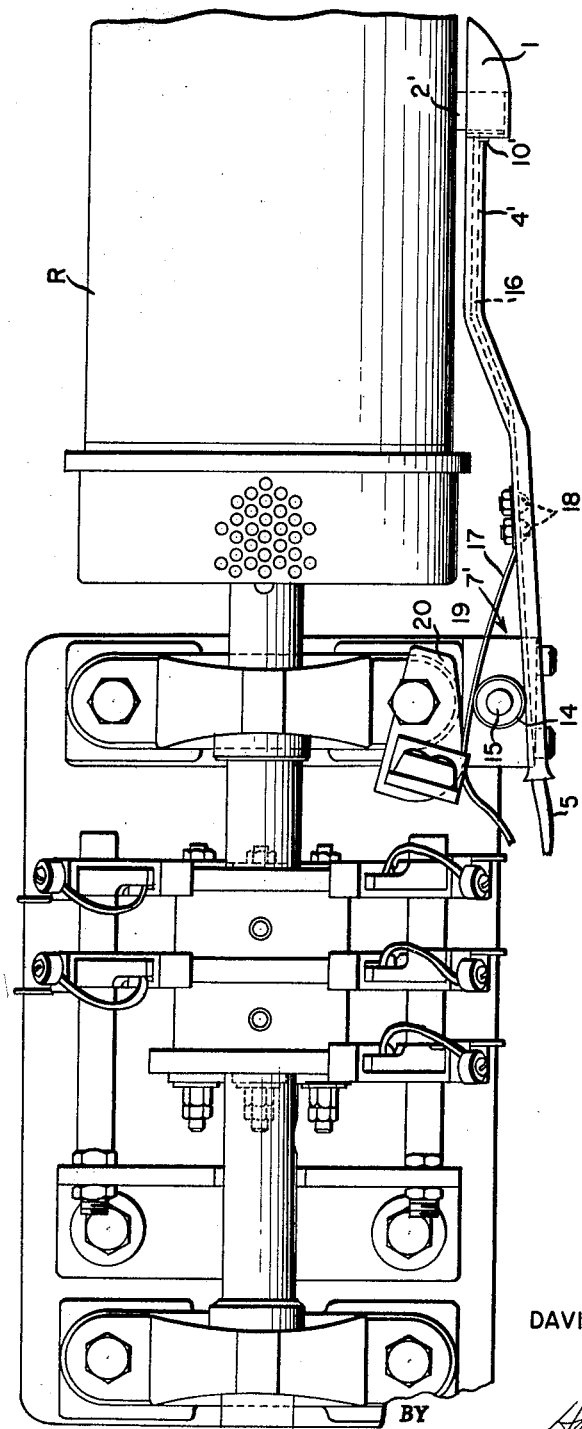
FIGURE 3 is a plan view of the apparatus shown in FIGURE 2.

FIGURES 2 and 3 illustrate the surface contacting means of FIGURE 1 with a slightly modified supporting bracket arrangement and in actual engagement with a heated roll structure. In this arrangement the surface contacting means is mounted on a composite support arm comprising a tubular element 4' and a stiffening member 16 both of which are rigidly secured, as by welding or brazing, to a rotatable bushing 14 mounted on fixed pin 15 mounted in bracket element 19. A leaf spring element 17, attached to element 16 by screws 18, engages abutment 20 to urge the contacting means into engagement with the heated roll R'.

The temperature sensing device of this invention is simple and economical to construct, install, and maintain yet provides a means for rapid, accurate, and continuous measurement of the temperature of moving surfaces. It is particularly suitable for measuring the surface temperature of heated rollers where it may be used at temperatures of 800° F. and higher and at roller speeds of 3,000 feet per minute and higher.

It will be understood that various modifications could be made in the disclosed embodiment of this invention without departing from the spirit of the invention or the scope of the appended claim.

I claim:

An improved temperature sensing apparatus for rapidly detecting and measuring very high temperatures on a rapidly moving high temperature precision finish surface, said apparatus consisting solely of a bracket unit mounted at a point adjacent a rapidly moving surface, a movable frame unit pivotally mounted on said bracket unit for selective movement between a first and second positions, a movable surface contact device carried by said movable frame unit and movable therewith between said first position in which said surface contact device is in contact with said moving surface and said second position in which said contact device is spaced from said moving surface, said contact device comprising a housing, an easily replaceable contact element positioned in said housing and having a portion projecting through an opening in said housing, and releaseable means for securing said contact element in position in said housing, a single resilient element cooperating with said frame unit and said bracket unit to urge said contact element into low constant pressure frictional engagement with said moving surface, a thermocouple element positioned in intimate interior contact with the material forming the interior mass of said surface contact element for generating an electric voltage signal in response to the temperature of said surface element and the surface with which the surface contact element is engaged, said surface contact element formed of a material selected from the group consisting of graphite and molybdenum said projecting portion of said surface contact element being provided with a relatively large contact surface area having a high heat transfer characteristic, low coefficient of friction and a slow even wear rate, said contact area characteristics and said low constant pressure resilient means cooperating to maintain said surface contact element and said thermocouple element substantially at the temperature of said moving surface without damage to the moving surface or substantial wear of said contact element surface area, and electrical conduit means for transmitting the temperature responsive electric voltage signal to a desired point of application, said moving surface being a highly polished surface of a heated metallic cylindrical roll element, the contact surface area of said contact element being provided with a contour mating that of the engaged portion of said roll element surface, and the thermocouple element being imbedded in said contacting element relatively close to the contacting element's contact surface, said roll element further provided with a heater unit and said thermocouple element operatively connected to an electric control circuit constructed and arranged to control the output of the heater unit to maintain the roll element at a substantially constant predetermined temperature.

References Cited in the file of this patent

UNITED STATES PATENTS

| | | |
|---|---|---|
| 1,220,635 | Hunter | Mar. 27, 1917 |
| 1,717,849 | Maynard | Apr. 2, 1927 |
| 2,480,703 | Bradner et al. | Aug. 30, 1949 |
| 2,947,171 | Peltola | Aug. 2, 1960 |